United States Patent Office 3,482,645
Patented Dec. 9, 1969

3,482,645
GAS-CUSHION DEVICES INTENDED TO SUPPORT OR GUIDE A MOVABLE LOAD
Jean Henri Bertin, Neuilly-sur-Seine, and Michel Jules Jacquot, Suresnes, France, assignors to Bertin & Cie, Paris, France, a company of France
Original application Apr. 27, 1966, Ser. No. 545,616, now Patent No. 3,414,076, dated Dec. 3, 1968. Divided and this application Mar. 22, 1968, Ser. No. 726,266
Claims priority, application France, Apr. 30, 1965, 15,435
Int. Cl. B60v 1/00
U.S. Cl. 180—124                                   3 Claims

ABSTRACT OF THE DISCLOSURE

A surface effect machine comprising a rigid, fluid permeable member axially spaced from an outer supporting frame and circumferentially attached thereto by an annular flexible skirt, the frame and member being tiltable relative to each other.

---

This application is a division of our copending application, Ser. No. 545,616 filed on Apr. 27, 1966, and since issued as Patent No. 3,414,076.

There are already known devices intended to support or guide a movable load by generating one or more fluid cushions under pressure between the load and the surface on which the load is required to move (ground or water in the case of vehicles or boats, guide members or bearings in the case of a shaft or a conveyor belt). The cushion is thus interposed between two distinct bodies, and prevents them from coming into direct contact.

In the remainder of this description, reference will be made to air-cushions for the sake of simplicity, air being the most convenient fluid, but it may be replaced by another gas or another fluid.

In order to confine the air-cushion under pressure, known devices comprise a jet forming a continuous curtain of fluid or a flexible solid wall.

A suitably profiled and orientated nozzle is required in order to produce a jet in the form of a curtain, and this constitutes a complication.

It is difficult for the amount of leakage at the lower periphery of the flexible solid wall to be kept substantially constant when facing an undulated supporting surface, because of the downstream tension imparted by the pressure of the cushion to this wall. In addition, the said wall is not suitable for directly supporting bodies at rest, and accessories therefore have to be provided.

The device to which the invention relates comprises, on one of the bodies, for example the vehicle or the support of a conveyor belt, a solid wall made of flexible material and arranged after the manner of an annular bead whereof the external edge is attached to the body under consideration, and whereof the internal edge is fixed to a central strut permeable to the air which is intended to produce the fluid cushion, this bead being so arranged that when inflated by air under pressure it forms a projection which turns its convexity towards the opposite body and laterally confines the air-cushion.

The bead is preferably made in such a way that when inflated it assumes substantially the shape of a torus or part of a torus sectioned in the vicinity of its equatorial plane. It thus intrinsically has a stable shape suitable for static support if it is kept at a certain pressure, while being sufficiently flexible to become deformed under the action of obstacles, for example roughness or unevenness in the ground, and even to become deformed in accordance with undulations in the ground in order to ensure a substantially constant amount of leakage along its lower perimeter.

The strut which carries the lower edge of the bead may be made in the form of a plate provided with holes distributed over its surface in order to allow for the passage of air.

According to one feature of the invention, it is advantageous to link this strut in fixed or movable fashion to the body carrying the bead. A movable link equipped with members which impart a certain return force to the strut, counterbalancing the load, and also equipped with dampers, enables a suspension system to be embodied.

The following description, which is given by way of non-limitative example, will give a good understanding in conjunction with the appended drawings of how the invention may be embodied, features apparent either from the text or from the figures naturally forming part of the said invention.

FIG. 2 is a diagrammatic plan view of the underside of the machine of FIGS. 1 and 1a.

Figure 1:
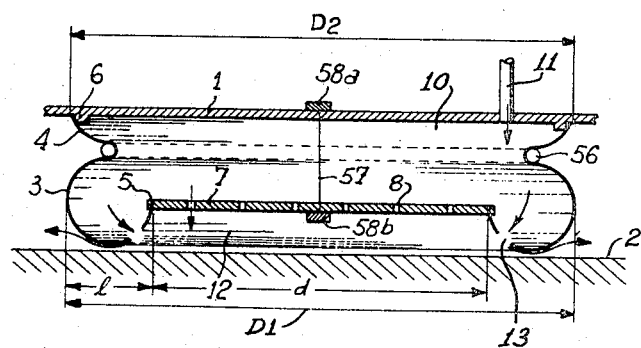
FIGS. 1 and 1a are transverse sectional views taken along line I—I in FIG. 2 of one embodiment of the invention, respectively illustrating the disposition of the machine relative to a horizontal and an inclined surface.
Figure 1A:
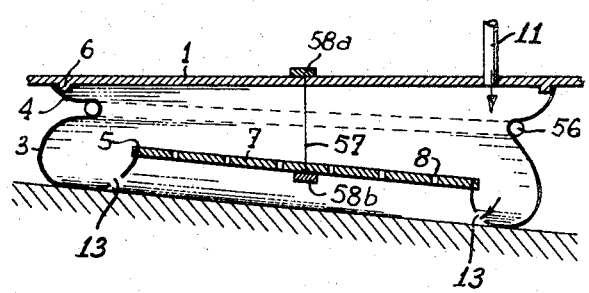
Figure 2:
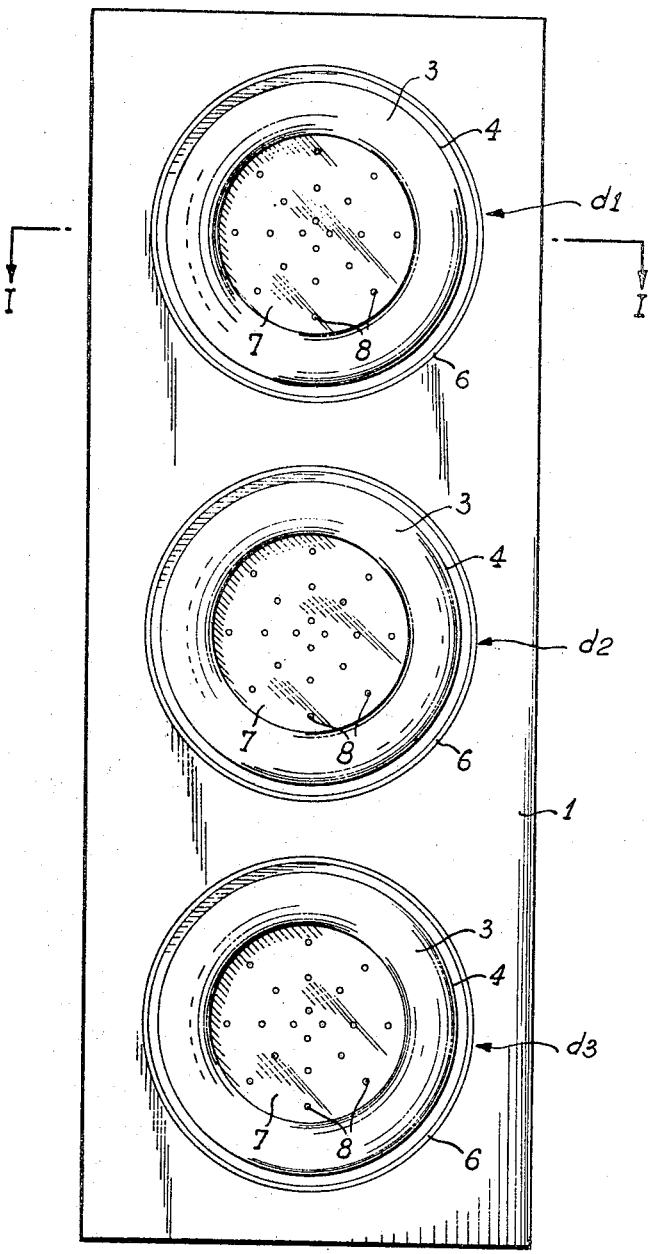

In FIGURES 1, 1a, and 2, one of the bodies which it is required to move is a land vehicle whereof the chassis may be seen at 1, while the other body 2 is the ground.

On its face turned towards the ground (FIGURE 2), the chassis 1 is equipped with devices $d_1$, $d_2$, $d_3$ suitable for producing the air-cushions, three in number in the example shown. (This number is clearly variable, and for wide platforms in particular cushions could be disposed symmetrically on either side of the axis of the platform.)

Each device for generating an air-cushion comprises an annular bead 3 made of a flexible material which is impermeable to air, such for example as a rubberized sheet. In the example shown, the edges 4 and 5 of this bead are of different diameters. The large-diameter edge 4 is attached to the internal face of a flange 6 fast with the wall 1 of the chassis of the platform. The internal edge 5 of the latter is fixed to the periphery of a strut-plate 7 drilled with holes 8 distributed over its surface, for example by small pillars 9 welded to the plate 7 and to the chassis. The space 10 bounded by the wall 1 of the chassis with its flange 6, the bead 3 and the plate 7 is fed with air under pressure from a suitable source by a conduit 11.

The radial width $l$ of the bead 3 is preferably less than the diameter $d$ of the strut-plate 7.

It will be understood that the air under pressure entering the space 10 inflates the bead 3, the latter being so arranged that it then assumes substantially the shape of part of a torus sectioned along two planes in the vicinity of the equatorial plane (planes of the edge 4 and the plate 7), turning its convexity towards the ground and projecting below the flange 6. The air also passes through the holes 8 in the plate 7 into the space 12 enclosed by the bead and the ground. However, if this air is not at too great a pressure the platform may be statically supported on the ground by the bead, while if the pressure is increased its effect acting on the platform 1 is to lift the latter until the bead is slightly separated from the ground (position of FIGURE 1). The air-cushion which is produced thus eliminates any solid contact between the platform and the ground, and there is no longer any solid friction to be overcome in order to move the platform.

The feeds to the various air-cushions are preferably independent of one another, so that a reduction in pressure in one cushion, for example due to an irregularity in the ground, has no effect on the feeds to the other cushions. Each cushion may thus have its own source of air under pressure, or the various cushions may be linked by independent pipe systems to a common generator of air under pressure.

The bead 3 may have a surface which is completely impermeable to air, or it may be drilled with holes 13 so orientated as to contribute to the feed of air to the space 12, while opposing leakage between the bead and the ground when the bead is spaced from the ground.

It will be understood that the flexibility of the bead enables it to become deformed in order to clear rough patches of ground.

The flange 6 which extends slightly downwards below the level of the edge 4 of the bead enables the platform to come to rest in the absence of air-pressure, and also makes it possible to avoid any excessive deformation of the bead 3 under the action of obstacles.

This flange is nevertheless not indispensable, and FIGURES 3 to 8 show some devices in which it is omitted, the edge 4 of the bead being fixed directly beneath the platform.

The variant in FIGURE 3 also differs from the form of embodiment in FIGURE 1 in that the strut-plate 7, instad of being rigidly fixed to the bottom of the chassis 1, is linked to the latter by elastic.

The strut 7 is suspended from the wall 1 of the chassis by a cable or wire 57 whereof the position coincides with the axis of the strut 7 when the load is uniformly distributed and the craft is resting on a horizontal surface. In order to fix the cable 57, its ends are attached to washers 58a and 58b fast with the chassis 1 and the strut 7 respectively, and substantially at the centre of the latter.

As will be understood, this arrangement enables the strut 7 and the bead to assume inclined positions with respect to the chassis 1 in order to follow variations in the inclination of the ground or other supporting surface (FIGURE 1a).

For the same purpose, the wire 57 could also be replaced by a rod terminating articulations at 58a and 58b.

In a plane passing between the plate 1 of the chassis and the strut 7, the diameter of the bead is preferably reduced by a hoop 56, thus increasing the flexible surface forming the bead and its capacity for deformation in order to follow irregularities in the ground, as shown in FIGURE 1a.

In some preferred embodiments, the external diameter $D_1$ of the torus formed by the bead 3 is at least equal to the diameter $D_2$ of the edge 4 fixed to the chassis.

It should be noted that the herein disclosed invention is realizable without restriction to various details disclosed herein by way of illustration only, for example, the bead and the strut-plate 7 could have a different shape in plan from the circular shape illustrated in FIGURE 2.

In general, the air under pressure could be replaced by a different fluid in the device described above.

What we claim is:

1. A surface effect machine movable along a bearing surface in spaced relationship therewith, comprising a rigid support frame, a flexible wall made of fluidtight material and inflatable by pressure fluid into an annular bead of general semitoric shape, presenting its convexity towards said bearing surface and connected at its outer periphery to said frame, a rigid fluid-permeable disc-shaped strut peripherally attached to the inner periphery of said bead and movable with respect to said rigid frame to the extent permitted by said flexible wall, tie means of finite length between a point of said rigid frame and a point of said rigid strut for restricting relative movableness of said frame and strut to a maximum spacing of said points equal to said finite length while allowing relative angular displacement of said frame and strut, and a hoop means fitted around said annular bead to restrict circumferentially the same.

2. Machine as claimed in claim 1, wherein the overall diameter of said annular bead is at least equal to the diameter of the outer periphery thereof connected to said support frame.

3. Machine as claimed in claim 1, wherein said fluid-permeable disc-shaped strut comprises a solid ported plate with a plurality of spaced ports formed right through the thickness thereof and distributed over the surface thereof.

References Cited

UNITED STATES PATENTS

| | | | |
|---|---|---|---|
| 3,104,496 | 9/1963 | Macks | 180—125 X |
| 3,321,038 | 5/1967 | Mackie et al. | 180—124 |

A. HARRY LEVY, Primary Examiner